(12) United States Patent
Suzuki

(10) Patent No.: US 7,448,785 B2
(45) Date of Patent: Nov. 11, 2008

(54) SURFACE ILLUMINATOR AND LIQUID CRYSTAL DISPLAY HAVING THE SAME

(75) Inventor: Toshihiro Suzuki, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 266 days.

(21) Appl. No.: 11/364,058

(22) Filed: Feb. 28, 2006

(65) Prior Publication Data

US 2006/0220040 A1    Oct. 5, 2006

(30) Foreign Application Priority Data

Feb. 28, 2005    (JP)    ............................. 2005-053977

(51) Int. Cl.
*F21V 7/04*    (2006.01)
*F21V 9/00*    (2006.01)
(52) U.S. Cl. ................. 362/612; 362/613; 362/231
(58) Field of Classification Search ......... 362/600–634, 362/230, 231, 800
See application file for complete search history.

(56) References Cited

U.S. PATENT DOCUMENTS

| 6,386,720 | B1 * | 5/2002 | Mochizuki | 362/27 |
| 6,981,792 | B2 * | 1/2006 | Nagakubo et al. | 362/600 |
| 7,220,040 | B2 * | 5/2007 | Lengyel et al. | 362/612 |
| 2003/0007344 | A1 * | 1/2003 | Parker | 362/31 |
| 2003/0137821 | A1 | 7/2003 | Gotoh et al. | |
| 2004/0042233 | A1 | 3/2004 | Suzuki et al. | |

FOREIGN PATENT DOCUMENTS

| JP | 2003-215349 | 7/2003 |
| JP | 2003-215349 A | 7/2003 |
| JP | 2004-095390 A | 3/2004 |
| WO | 02/090826 A1 | 11/2002 |

OTHER PUBLICATIONS

"Mixing of RGB Colors Using Mirrors"; Nikkei Electronics; No. 844; pp. 126-127.

* cited by examiner

*Primary Examiner*—Bao Q Truong
(74) *Attorney, Agent, or Firm*—Keating & Bennet, LLP

(57) ABSTRACT

The invention relates to a surface illuminator and a liquid crystal display having the same and provides a surface illuminator capable of achieving high display quality by employing an array of discrete light sources and a liquid crystal display having the same. A reflective surface for reflecting light in a light guide region of a light guide extends from an end of a light entrance surface through which light enters the light guide region. An LED light source serving as an array of discrete light source is constituted by a red emission LED, a green emission LED, a blue emission LED, and another green emission LED provide alternately and discretely along the light entrance surface. A red LED serving as an end light source provided at the end of the LED light source on the side of an end of a reflective surface is disposed such that about one half of an emitting region of the same is obscured by the reflective surface to prevent about one half of the quantity of light emitted from entering the light guide region.

19 Claims, 5 Drawing Sheets

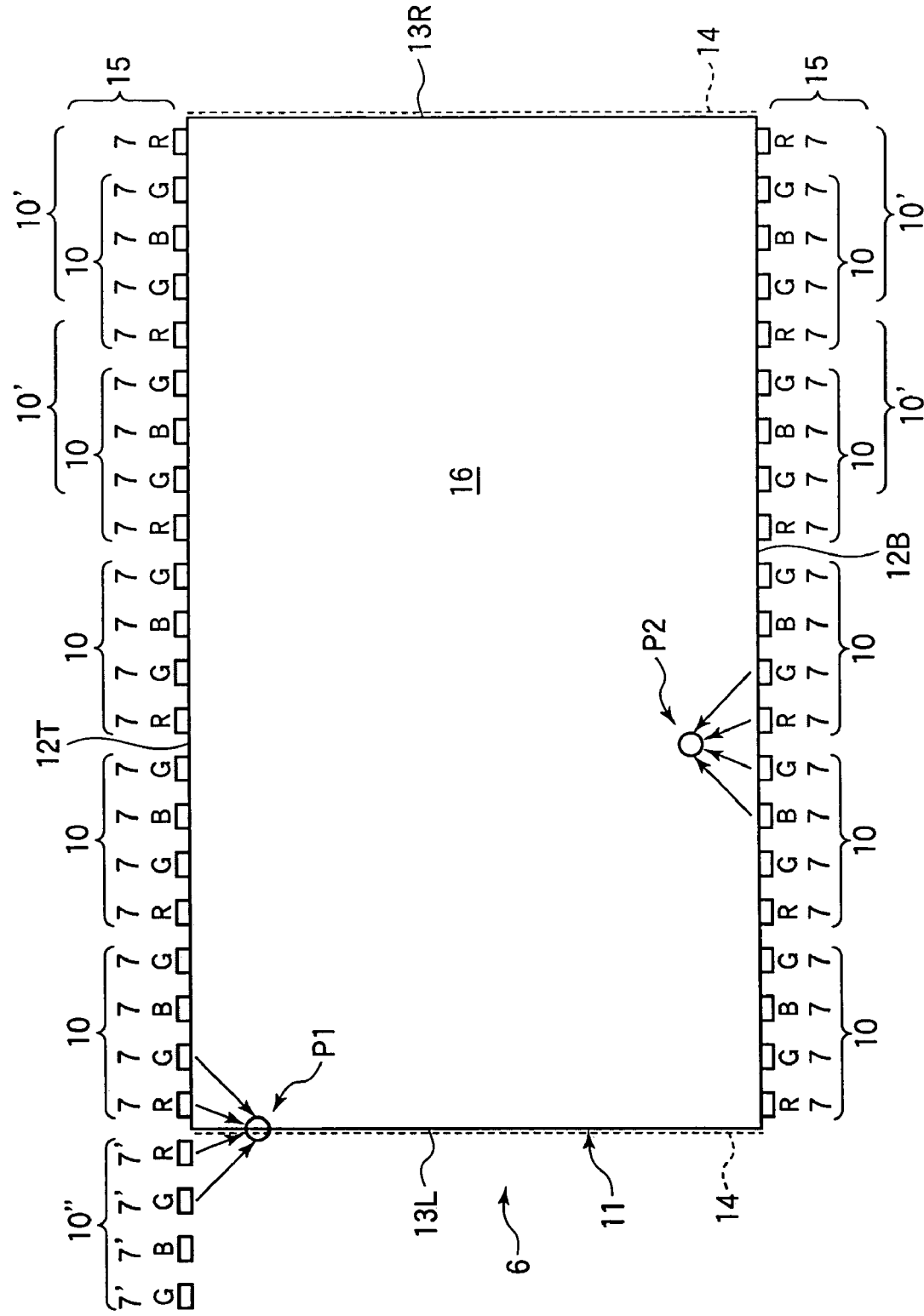

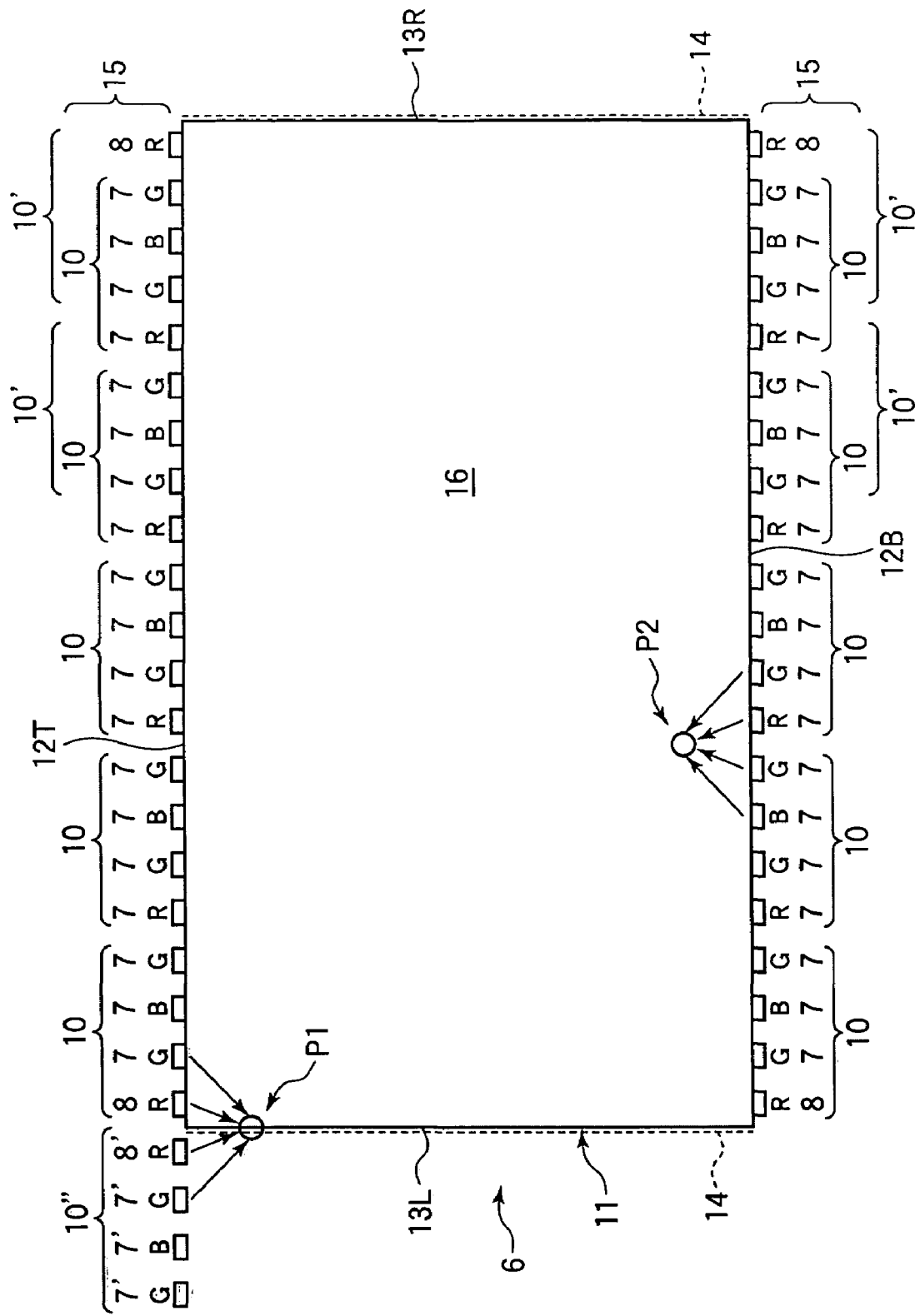

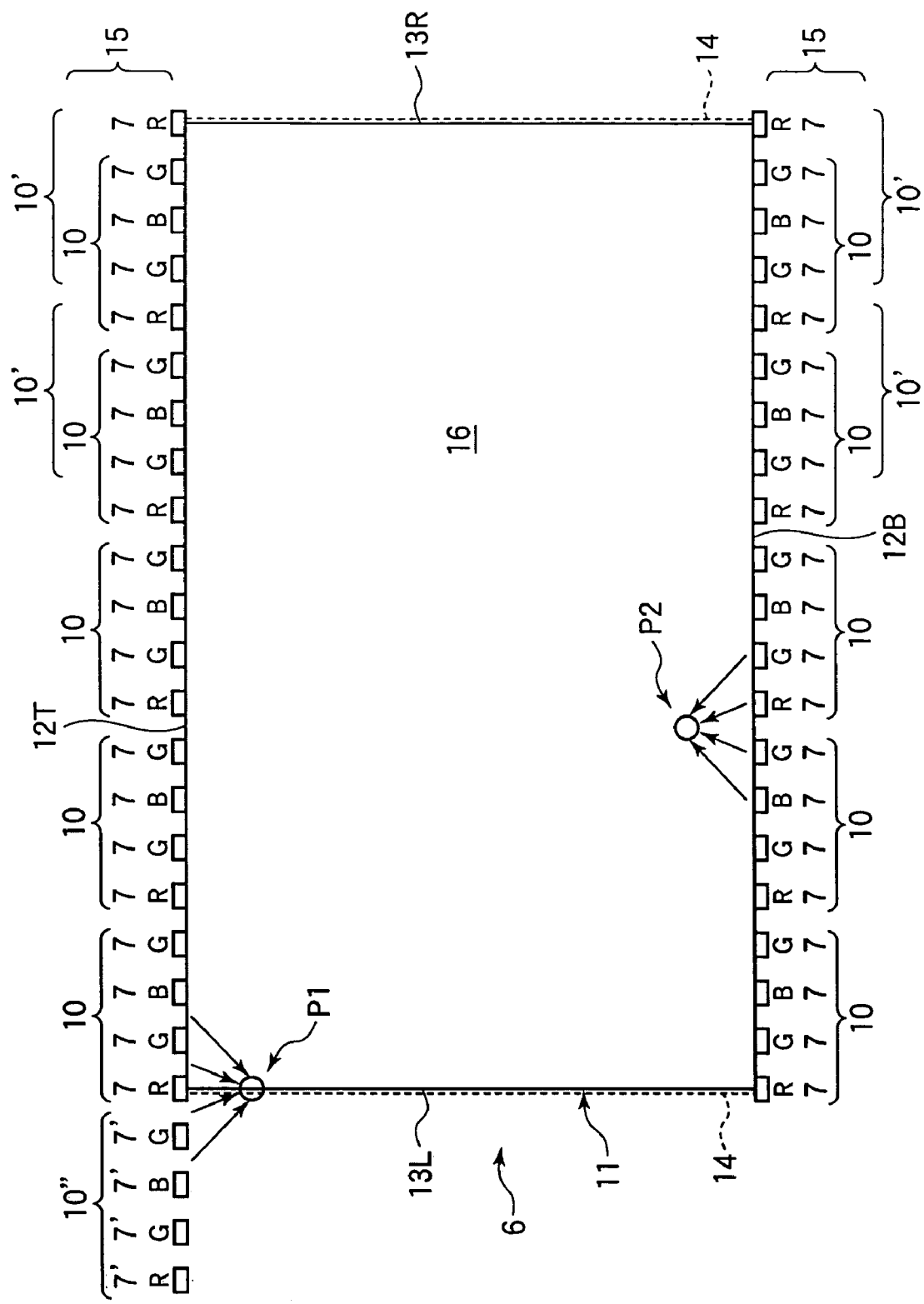

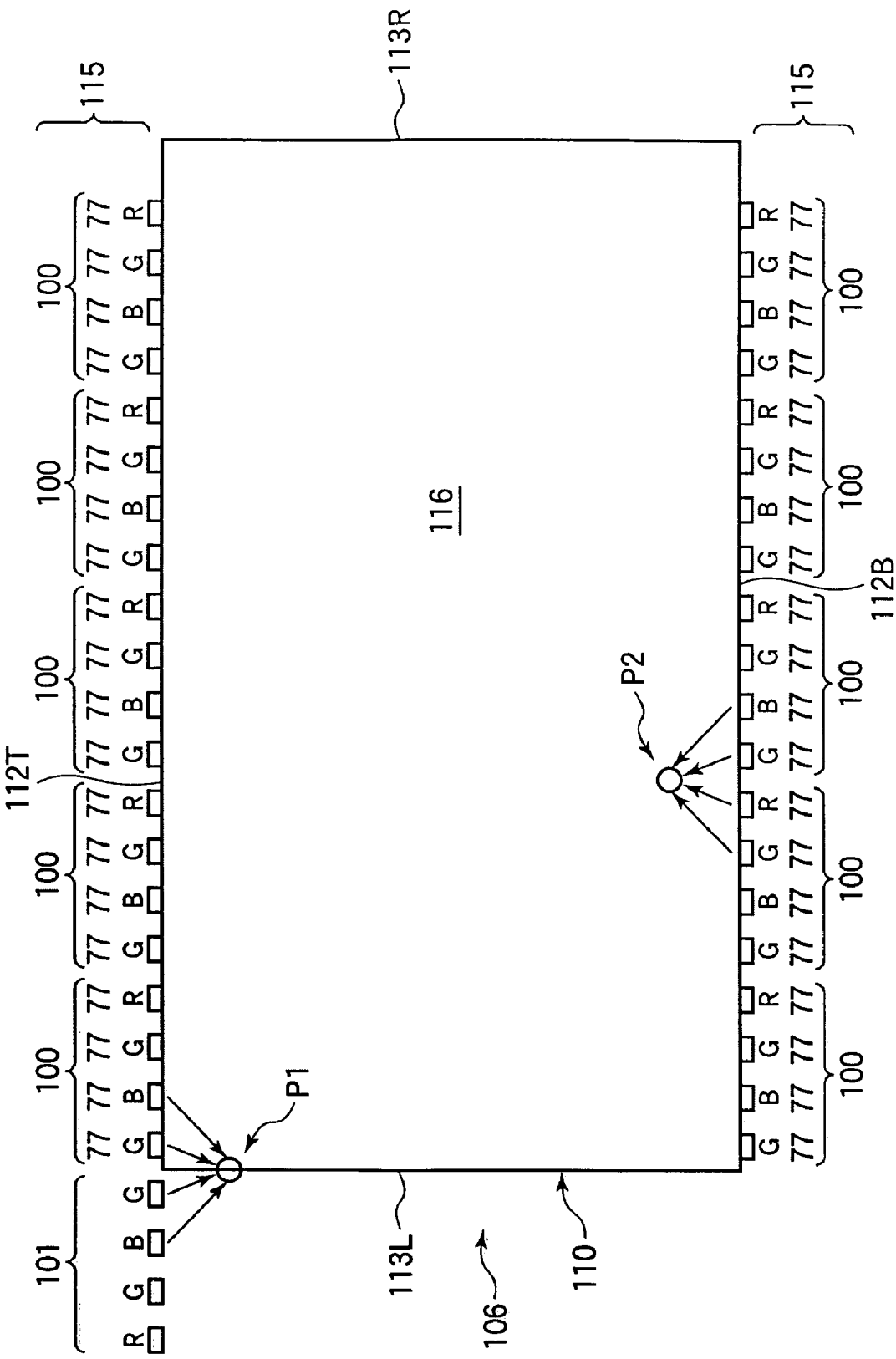

SURFACE ILLUMINATOR AND LIQUID CRYSTAL DISPLAY HAVING THE SAME

BACKGROUND OF THE INVENTION

1. Field of the Invention

The present invention relates to a surface illuminator utilizing an array of discrete light sources and a liquid crystal display having the same.

2. Description of the Related Art

A liquid crystal display is provided with a surface illuminator on a front side or back side of a liquid crystal display panel thereof. Backlight units which are surface illuminators disposed on the back side of a panel include side light (edge light) types including a light source disposed along a side edge of a light guide for guiding light and direct types including a light source disposed directly under a liquid crystal display panel. Referring to the use of those types of illuminators in general, side light type backlight units are used in liquid crystal displays having screen sizes of 20 (20 inches in the diagonal direction) or less and liquid crystal displays which must have an especially small thickness. While either type of illuminators generally employ a cold-cathode tube as a light source, it is not preferable to use a cold-cathode tube that utilizes mercury under the recent circumstance in which environmental problems are taken seriously. For this reason, various light sources such as mercuryless fluorescent tubes and LEDs (light-emitting diodes) have been developed as light sources to replace cold-cathode tubes, and LEDs are regarded as promising next generation light sources.

When LEDs are used as a light source of a side light type backlight unit, the light source may be configured by arranging a plurality of white LEDs or arranging a plurality of sets of LEDs, each set consisting of monochromatic LEDs emitting light in different colors (e.g., red (R), green (G), and blue (B)). A white LED is a combination of a yellow-emitting fluorescent body and a blue-emitting LED, and it has relatively small variation in the color of emission. Backlight units utilizing a combination of R, G, and B monochromatic LEDs are attracting keen attention for their capability of achieving a vast range of color reproducibility which is not achievable with white LEDs.

For example, in the case of a primary color emitting LED set utilizing R emission LEDs, G emission LEDs, and B emission LEDs in combination, since the width of each LED is about 10 mm, LEDs in the same color are disposed at intervals of 30 mm or more from each other. Therefore, a method of mixing emission colors is needed. Lumileds Lighting LLC has proposed a system (sub light guide system) in which a light guide region for mixing emission colors is not used as a display area (see Non-Patent Document 1). Non-Patent Document 1 discloses a backlight having a double light guide structure in which a sub light guide is used. The sub light guide mixes RGB colors and causes resultant light in uniform white color to impinge on a main light guide located above the same. There is a problem in that the system as a whole results in very low utilization of light because light enters the sub light guide from LEDs and enters the sub light guide from the main light guide at low efficiency. Since the low utilization of light necessitates an increase in the power supplied and consequently necessitates countermeasures against heat, a problem also arises in that the size of a device is increased to accommodate a radiation fin. Another problem arises in that there is a cost increase attributable to an increase in the number of LEDs used.

As a solution to those problems, a backlight unit has been proposed, in which an air region having a predetermined thickness is provided between a light guide and a diffusing plate to improve mixing of emission colors. FIG. 6 schematically shows the light guide and LED light sources used in the proposed backlight unit. As shown in FIG. 6, LED light sources 115 are provided on both of side surfaces (light entrance surfaces) 112T and 112B along the longer sides of a rectangular light-emitting surface 116 of a light guide 110 in the form of a thin plate. Both of side surfaces along the shorter sides of the light guide 110 are constituted by reflective surfaces 113L and 113R to allow high utilization of light from the LED light sources 115.

The number of LEDs 77 in each color among the LED light sources 115 is determined by the setting of white balance. For reasons associated with the amount of emission from LEDs, it is preferable to combine one each B (blue) emission LED 77B and R (red) emission LED 77R with two G (green) emission LEDs 77G. By arranging the LEDs 77 in each color at equal intervals, the colors of the individual LEDs 77 are visually perceived at substantially the same distance from a light entrance surface 112 regardless of the types of the LEDs 77. Attention is paid here to color uniformity, and a minimum unit array "GBGR" is therefore employed to space two green emission LEDs 77G away from each other in a minimum unit array constituted by a B (blue) emission LED, an R (red) emission LED, a G (green) emission LED, and another G (green) emission LED and to prevent the green emission LEDs 77G from adjoining each other even when minimum unit arrays are arranged consecutively.

Therefore, the LED light sources 115 include LED sets (hereinafter also referred to as "GBGR" sets as occasion demands) 100 located at side ends of the reflective surface 113L, the LED sets being a series of LED sets starting at the ends of the reflective surface 113L and each consisting of a G (green) emission LED 77G, a B (blue) emission LED 77B, another G (green) emission LED 77G, and an R (red) emission LED 77R provided in the order listed. A plurality of the LED light sources 115 are arranged in series from the left ends of the light entrance surfaces 112T and 112B of the light guide 110, and "GBGR" sets serving as unit light sources, the width of the "GBGR" sets constituting a pitch of the light sources.

When such a configuration is employed, at an arbitrary point P2 inside the light exit surface 116, four beams of light from a G emission LED 77G, a B emission LED 77B, another G LED emission 77G, and an R emission LED 77R in the neighborhood of the arbitrary point P2 can be mixed to generate a beam of light in a desired color.

Let us now discuss an arbitrary point P1 which is located, for example, in the neighborhood of the top of the reflective surface 113L along the left shorter side of the light exit surface 116. Light arriving at this point includes not only direct light from the "GBGR" set 100 at the left end of the light entrance surface 112T but also light from an "RGBG" set 101 which is a mirror image generated as a result of reflection of the light from the "GBGR" set 100 at the reflective surface 113L. The result is equivalent to arranging a set of eight LEDs, i.e., R, G, B, G, G, B, G, and R LEDs in the order listed from the left side of the figure in the neighborhood of the arbitrary point P1. Beams of light from a four-LED set, i.e., a "BGGB" set that is located closer to the arbitrary point P1 among the eight LEDs are mixed with each other at relatively high intensity. Even if the LED set of interest is expanded to include six LEDs closer to the point, it becomes a "GBGGBG" set which includes no "R" LED. As a result, mixed white that lacks a red component is generated at the arbitrary point P1, and a problem therefore arises in that a color irregularity is liable to occur in the neighborhood of the top end of the reflective surface 113L. Such a color irregularity can occur also at the bottom end of the reflective surface 113L and the top and bottom ends of the reflective surface 113R on the right when the same LED arrangement is employed. The same problem occurs even if the LED sets 100 have a "GRGB" pattern instead of the "GBGR" pattern.

Patent Document 1: JP-A-2003-215349

Patent Document 2: JP-A-2004-95390

Non-Patent Document 1: Nikkei Electronics No. 844 pp. 126-127, Mar. 31, 2003

SUMMARY OF THE INVENTION

It is an object of the invention to provide a surface illuminator which employs an array of discrete light sources to provide high display quality and a liquid crystal display having the same.

The above-described object is achieved by a surface illuminator characterized in that it includes a light exit region which spreads in the form of a plane and from which light exits, a light guide region for guiding light to the light exit region, a light entrance surface through which light enters the light guide region, a reflective surface extending from an end of the light entrance surface and reflecting light in the light guide region, an array of discrete light sources which are plural types of light sources emitting beams of light having different emission wavelength spectra and which are alternately and discretely provided along the light entrance surface, and an end light source for emitting light having a quantity of light smaller than that of the other light sources of the same type in the array of discrete light sources toward the light guide region.

The invention makes it possible to provide a surface illuminator employing an array of discrete light sources to provide high display quality and a liquid crystal display having the same.

BRIEF DESCRIPTION OF THE DRAWINGS

FIG. 3 shows a positional relationship between a light exit surface 16 of a light guide 11 of the backlight unit 6 and LED light sources 15 according to the first embodiment in a view taken in a direction normal to the light exit surface 16;

FIG. 4 shows a positional relationship between a light exit surface 16 of a light guide 11 of a backlight unit 6 and LED light sources 15 according to a second embodiment of the invention in a view taken in a direction normal to the light exit surface 16;

FIG. 5 shows a positional relationship between a light exit surface 16 of a light guide 11 of a backlight unit 6 and LED light sources 15 according to a third embodiment of the invention in a view taken in a direction normal to the light exit surface 16; and FIG. 6 schematically shows a light guide and LED light sources used in a backlight unit according to a proposal.

DESCRIPTION OF THE PREFERRED EMBODIMENT

First Embodiment

Figure 1:
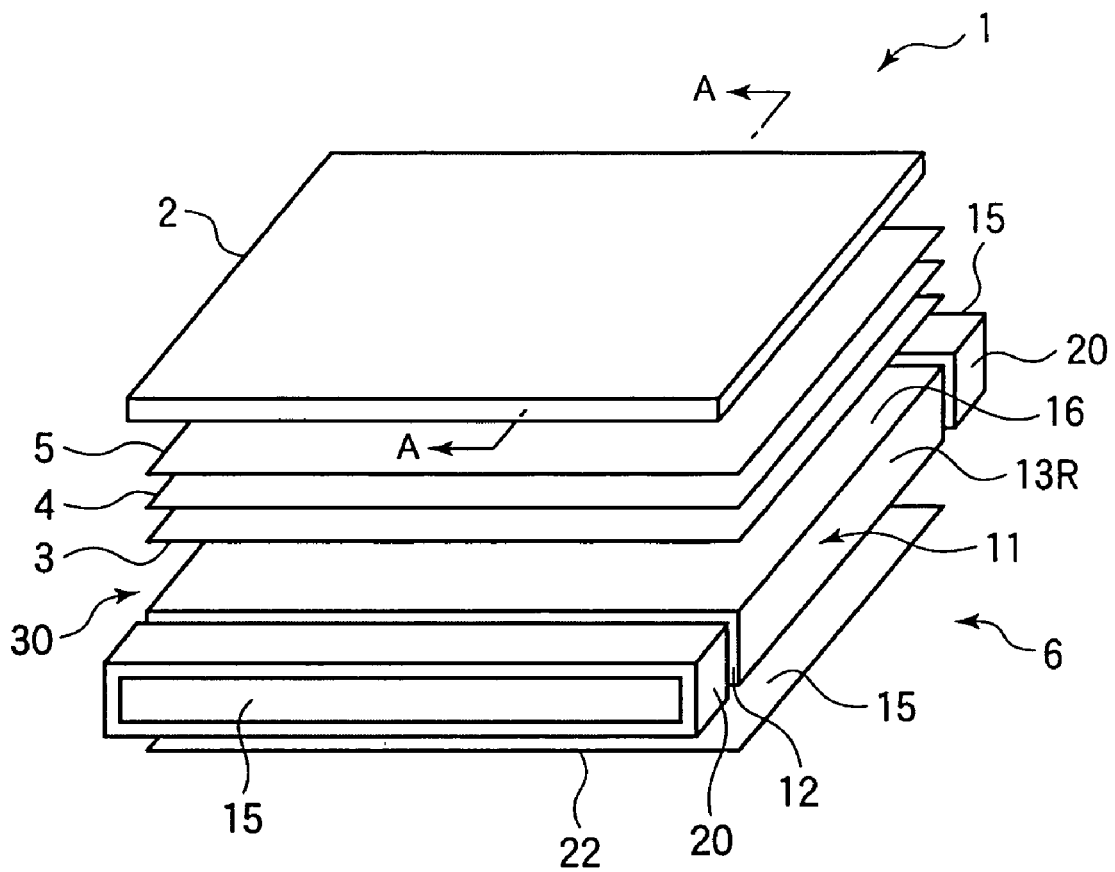
FIG. 1 is an exploded perspective view showing a schematic structure of a liquid crystal display having a backlight unit as a surface illuminator according to a first embodiment of the invention.
Figure 2:
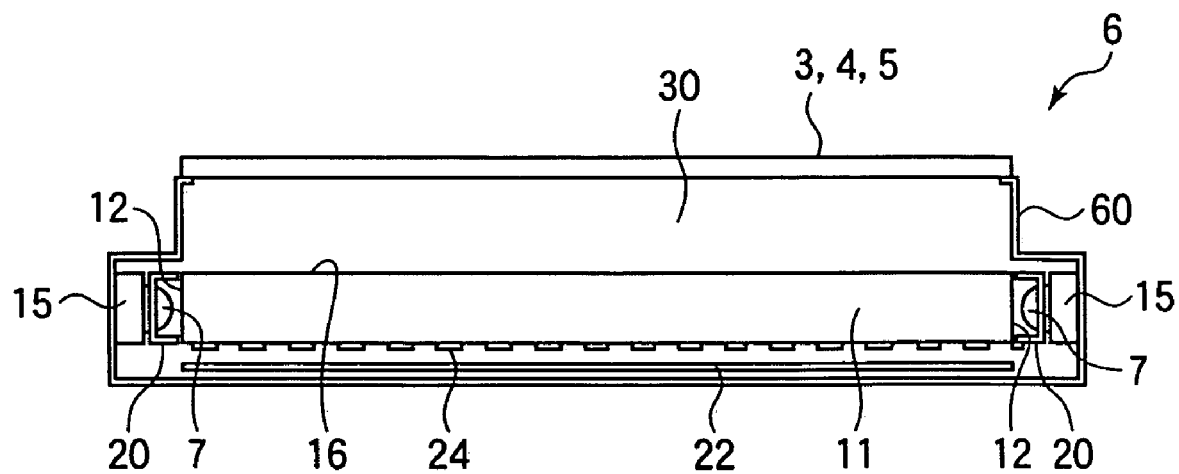
FIG. 2 is a view of a main structure of a backlight unit 6 taken along the line A-A on the liquid crystal display shown in FIG. 1 according to the first embodiment of the invention.

A description will now be made with reference to FIGS. 1 to 3 on a surface illuminator employing an array of discrete light sources and a liquid crystal display having the same according to a first embodiment of the invention. FIG. 1 is an exploded perspective view showing a schematic structure of a liquid crystal display 1 having a backlight unit as a surface illuminator according to the present embodiment. FIG. 2 is a view of a main structure of the backlight unit 6 of the liquid crystal display shown in FIG. 1 taken along the line A-A. As shown in FIGS. 1 and 2, the liquid crystal display 1 of the present embodiment includes a liquid crystal display panel 2 provided by sealing a liquid crystal between a pair of substrates and the backlight unit 6 which is a surface illuminator.

The backlight unit 6 includes a light guide 11 which is constituted by, for example, a transparent member in the form of a rectangular thin plate having a predetermined thickness. The light guide 11 has a light exit region (hereinafter referred to as a light exit surface) 16 which spreads in the form of a plane on a side of the light guide facing the liquid crystal display panel 2 and from which light exits. The surface of the light guide 11 opposite to the light exit surface 16 is a light scattering surface on which scattering dots 24 serving as a light output portion are printed. A reflective sheet 22 is provided on the side of the light scattering surface of the light guide 11 opposite to the light exit surface 16.

The region sandwiched by the light exit surface 16 of the light guide 11 and the light scattering surface opposite to the same is a light guide region for guiding light to the light exit surface 16. Among four side portions of the light guide around the peripheries of the light exit surface 16 and the light scattering surface, both side portions along two sides of the light guide opposite to each other, e.g., the longer sides thereof, constitute light entrance surfaces 12 through which light enters the light guide region. Two side surfaces of the light guide extending to connect both ends of the two opposite light entrance surfaces 12 respectively constitute reflective surfaces 13 for reflecting light in the light guide region.

LED light sources 15, which are arrays of discrete light sources, are provided on the light entrance surfaces 12 of the light guide 11. The LED light sources 15 are formed by alternately and discretely arranging plural types of LEDs 7 emitting beams of light having different emission wavelength spectra along the light entrance surfaces 12. Reflectors 20 for allowing light from the LED light sources 15 to efficiently enter the light guide 11 are provided around the LED light sources 15.

A gas space 30 having a predetermined thickness for mixing beams of light from the LED light sources 15 is provided between the light guide 11 and the liquid crystal display panel 2. Optical sheets such as a transmissive diffusing plate 3 having a thickness of, for example, about 2 mm and lens sheets 4 and 5 are provided between the gas space 30 and the liquid crystal display panel 2.

As thus described, the backlight unit 6 has a configuration in which a reflective sheet 22, the light guide 11, the gas space 30, and the optical sheets 3, 4, and 5 are provided one over another in the order listed. Those constituent members are secured by a housing 60.

Light mixing and light emitting operations at the backlight unit 6 will now be briefly described. As shown in FIG. 2, beams of light emitted by the LED light sources 15 to enter the light entrance surfaces 12 of the light guide 11 are guided through the light guide region and scattered by the scattering dots 24. Some of the beams exit the light exit surface 16 into the gas space 30, and the rest of the beams are reflected by the reflective sheet 22 to return to the light guide region of the light guide 11 and are reflected again by the scattering dots 24 to finally exit the light exit surface 16 into the gas space 30. Those exiting beams are emitted as beams of light traveling in directions which are close to an in-plane direction of the light exit surface 16 and which are at a great angle θ to a direction normal to the light exit surface 16. Therefore, the beams of light which have exited the light exit surface 16 travel in the gas space 30 for some time instead of immediately entering the liquid crystal display panel 2. As a result, a beam of light which has been output and which has not been mixed with beams of light from other LEDs 7 yet in the neighborhood of the light entrance surface 16 is mixed with other beams of light and spread in a wide area of the panel 2 while it travels in the gas space 30. Thus, neither color irregularity nor luminance irregularity will be visually perceived. That is, the gas space 30 has the function of mixing beams of light having different emission wavelength spectra or different quantities of light to make them uniform in an in-plane direction of the backlight unit 6. The optical sheets 3, 4, and 5 have the function of mixing beams of light traveling at different angles at the same point in the plane to re-orient the angles of the beams, thereby making the color and quantity of illuminating light uniform in the plane.

In practice, beams of light exit the light guide 11 in directions which are at considerably great angles (θ=70 to 80°) to the direction normal to the light exit surface 16. When a beam of light which has exited the light guide 11 at a certain exit point is to be made to enter the transmisive diffusing plate 15 after traveling, for example, about 50 mm in an in-plane direction from the exit point, the thickness of the gas space 30 (the distance between the light exit surface 16 and the transmissive diffusing plate 5) must be in the range from 9 to 18 mm. In the present embodiment, the thickness of the gas space 30 is about 15 mm. Since the beam of light is diffused while it travels in the gas space 30 as far as 50 mm, it is subjected to color mixing with other beams of light, and the quantity of the light itself dramatically decreases in a near vertical direction. Thus, the light will be less likely to be visually perceived as an irregularity in color or luminance.

The scattering dots 24 may alternatively be provided on the light exit surface 16 of the light guide 11 (on the side of the gas space 30). However, when the scattering dots 24 are provided on the light exit surface 16 of the light guide 11, a beam of light which has impinged on a scattering dot 24 among guided light will exit the light guide 11 toward the panel 2 while being scattered substantially along the principal beam of the incident light with the incident angle characteristics of the beam maintained. That is, the beam will have a smaller exit angle θ and will therefore travel a shorter distance in the gas space 30. Therefore, a beam of light which has been output and which has not been mixed with beams of light from other LEDs 7 yet in the neighborhood of the light entrance surface 12 enters the panel 2 without being sufficiently mixed with other beams of light in the gas space 30, and the light will therefore be visually perceived as an irregularity in color or luminance. In order to ensure a sufficient distance that a beam of light travels in the gas space 30, the thickness of the gas space 30 must be greater than that in the configuration shown in FIGS. 1 and 2. However, an increase in the thickness of the gas space 30 results in an increase in the size of the backlight unit 6. Therefore, to provide a compact backlight unit 6 which results in no visually perceivable irregularity in color and luminance, it is effective to provide the light output features such as the scattering dots 24 on the side of the light guide 11 where the reflective sheet 22 is located instead of the side of the light exit surface 16.

FIG. 3 shows a positional relationship between the light exit surface 16 of the light guide 11 of the backlight unit 6 and the LED light sources 15 in the present embodiment in a view of the unit taken in a direction normal to the light exit surface 16. In FIG. 3, the two side surfaces extending opposite to each other along the longer sides of the rectangular light exit surface 16 constitute light entrance surfaces 12T and 12B, and the two side surfaces extending opposite to each other along the shorter sides constitute reflective surfaces 13R and 13L.

A plurality of LED sets (hereinafter also referred to as "RGBG" sets as occasion demands) 10 are arranged in series along the light entrance surfaces 12T and 12B of the light guide 11 starting in the neighborhood of the left ends of the light entrance surfaces 12T and 12B (for example, five LED sets may be provided as shown), each set including an R (red) emission LED 7R, a G (green) emission LED 7G, a B (blue) emission LED 7B, and another G (green) emission LED 7G provided in series in the order listed at substantially equal intervals.

At the right ends of the light entrance surfaces 12T and 12B of the light guide 11, R (red) emission LEDs 7R are provided adjacent to the LEDs 7G on the right ends of the "RGBG" sets 10 in the neighborhood of the right ends of the light entrance surfaces 12T and 12B at a predetermined interval from the respective LEDs 7G. Providing the R (red) emission LEDs 7R at the right ends of the light entrance surfaces 12T and 12B of the light guide 11 is equivalent to arranging a plurality of "RGBG" sets 10' in series from the right ends of the light entrance surfaces 12T and 12B of the light guide 11 toward the left ends thereof.

Reflective surfaces 13L and 13R extending from both ends of the two light entrance surfaces 12T and 12B are mirror-finished to improve the efficiency of regular reflection of light from the LED light sources 15. Further, reflective sheets 14 are disposed on backsides of the reflective surfaces 13L and 13R (the outside of the reflective surfaces 13L and 13R) to return light which has passed through the reflective surfaces 13L and 13R to the light guide region. The invention is not limited to such a configuration, and the reflective surfaces 13L and 13R may alternatively be provided by depositing or applying reflective films on polished surfaces. Further, the present embodiment is applicable even when the reflective surfaces 13L and 13R are rough cut surfaces which have not been mirror-finished.

In the positional relationship between the LED light sources 15 and the light entrance surfaces 12T and 12B in such a configuration, at an arbitrary point P2 inside the light exit surface 16, beams of light from an LED 7R, an LED 7B, and two LEDs 7G in the neighborhood of the arbitrary point P2 can be mixed to generate a beam of light in a desired color.

Light arriving at an arbitrary point P1 located in the neighborhood of the left end of the light entrance surface 12T includes not only direct light from the "RGBG" set 10 at the left end of the light entrance surface 12T but also light from an "RGBG" set 10" which is a mirror image of the light from the "RGBG" set 10 projected on the reflective surface 13L. As a result, R, G, B, and G beams of light arrive at the neighborhood of the arbitrary point P1 from the right side of the reflective surface 13L, and R, G, B, and G beams of light also arrive there from the left side of the reflective surface 13L. That is, the result is equivalent to arranging a "GBGR" set 10" and an "RGBG" set 10 in the order listed from the left side of the figure in the neighborhood of the arbitrary point P1.

Among those sets of LEDs, the four LEDs 7 and 7' closer to the point constitute a "GRRG" set, and beams of light from the set are mixed with each other at relatively high intensity. However, since a B LED is provided on both sides of the "GRRG" set, there is a "BGRRGB" set when attention is paid to the six LEDs 7 and 7' close to the point. Although the LED set is somewhat insufficient in blue components, the configuration allows color irregularities in the neighborhood of the top end of the reflective surface 13L to be significantly reduced when compared to the configuration according to the related art shown in FIG. 6. The same configuration also makes it possible to reduce color irregularities in the neighborhood of the bottom end of the reflective surface 13L significantly.

Similarly, light arriving at an arbitrary point (not shown) located in the neighborhood of the right end of the light entrance surface 12T includes not only direct light from the "RGBG" set 10' at the right end of the light entrance surface 12T but also light from an "RGBG" set 10 (not shown) which is a mirror image of the light from the "RGBG" set 10' projected on the reflective surface 13R. As a result, R, G, B, and G beams of light arrive at the neighborhood of the arbitrary point from the left side of the reflective surface 13R, and R, G, B, and G beams of light also arrive there from the right side of the reflective surface 13R. That is, the result is equivalent to arranging a "GBGR" set 10' and an "RGBG" set (not shown) in the order listed from the left side of the figure in the neighborhood of the arbitrary point. Among those sets of LEDs, the four LEDs 7 closer to the point constitute a "GRRG" set, and beams of light from the set are mixed with each other at relatively high intensity. However, since a B LED is provided on both sides of the "GRRG" set, there is a "BGRRGB" set when attention is paid to the six LEDs 7 closer to the point. Although the LED set is somewhat insufficient in blue components, the configuration allows color irregularities in the neighborhood of the top end of the reflective surface 13R to be significantly reduced when compared to the configuration according to the related art shown in FIG. 6. The same configuration also makes it possible to reduce color irregularities in the neighborhood of the bottom end of the reflective surface 13R significantly.

As thus described, the present embodiment actively uses a mirror effect generated by reflection at the reflective sheets 14 disposed on or in the neighborhood of the reflective surfaces 13L and 13R at ends of the light guide 11 to allow LEDs 7 emitting in different colors to be spaced and arranged in a preferable manner. It is therefore possible to provide a surface illuminator having high color uniformity and a liquid crystal display having the same. The generation of mixed white suffering from an extreme shortage of red components can be suppressed at an arbitrary point in the neighborhood of an end of a light entrance surface 12T, and color irregularities can be made unnoticeable.

In the present embodiment, since mixing of light can be promoted in the neighborhood of side surfaces of the light guide, generation of visually perceivable color irregularities on the reflective surfaces 13 can be suppressed even when the thickness of the gas space 30 is set small. The present embodiment therefore makes it possible to eliminate irregularities in color and luminance in the neighborhood of the reflective surfaces 13 without an increase in the size of the backlight unit 6.

When the present embodiment is applied to a surface light source system utilizing an array of discretely disposed light sources such as LEDs and a liquid crystal display having such a system, the LED backlight unit and the liquid crystal display can be provided with high uniformity in color and luminance.

Second Embodiment

A description will now be made with reference to FIG. 4 on a surface illuminator employing an array of discrete light sources and a liquid crystal display having the same according to a second embodiment of the invention. A surface illuminator 6 of the present embodiment is similar in configuration to the surface illuminator 6 in the first embodiment, and it has a configuration according to the first embodiment as shown in FIGS. 1 and 2. Therefore, elements identical to those in the first embodiment in operations and effects will be indicated by like reference numerals, and the description thereof will be omitted.

FIG. 4 shows a positional relationship between a light exit surface 16 of a light guide 11 of the backlight unit 6 and LED light sources 15 in the present embodiment in a view of the unit taken in a direction normal to the light exit surface 16. The present embodiment is different from the first embodiment in that it is characterized by R (red) emission LEDs 8R provided as end light sources at side ends of reflective surfaces 13L and 13R for arrays of discrete light sources instead of the LEDs 7R at both ends of the light entrance surfaces 12T and 12B of the light guide 11, the LEDs 8R emitting light in a smaller quantity than other LEDs 7R toward the light guide region. More specifically, the end light source LEDs 8R emits a quantity of light that is substantially one half of that emitted from other light source LEDs 7R of the same type. As a general LED driving circuit (not shown), the end light source LEDs 8R may be made to emit light in a quantity smaller than that emitted by the other LEDs 7R by a predetermined amount by supplying the end light source LEDs 8R with a current smaller than a current supplied to the LEDs 7R by a predetermined amount. Alternatively, R (red) emission LEDs having low emission efficiency may be used as the end light source LEDs 8R.

Just as in the first embodiment, light arriving at an arbitrary point P1 located in the neighborhood of the left end of a light entrance surface 12T includes not only direct light from an "RGBG" set 10 at the left end of the light entrance surface 12T but also light from an "RGBG" set 10" which is a mirror image of the light from the "RGBG" set 10 projected on the reflective surface 13L. The result is equivalent to arranging a "GBGR" set 10" and an "RGBG" set 10 in the order listed from the left side of the figure in the neighborhood of the arbitrary point P1. Among those sets of LEDs, four LEDs 7, 7' 8, and 8' closer to the point constitute a "GRRG" set, and beams of light from the set are mixed with each other at relatively high intensity. However, since the quantity of light emitted by the end light source LEDs 8R is substantially one half of that from other LEDs 7R, the quantity of "R" light of the "GRRG" set is substantially equivalent to that of one LED 7R. It is therefore possible to suppress intensification of red and to thereby achieve prevention of a color irregularity at a higher degree than the first embodiment. Since a B LED is provided on both sides of the "GRRG" set, there is a "BGRRGB" set when attention is paid to the six LEDs 7, 7', 8, and 8' close to the point. White light having a better balance can be provided by such an LED set, and color irregularities in the neighborhood of the top end of the reflective surface 13L can be significantly reduced. The same configuration also makes it possible to reduce color irregularities in the neighborhood of the bottom end of the reflective surface 13L and top and bottom ends of the reflective surface 13R significantly.

The periodicity of the LED arrangement attributable to mirror inversion as a result of projection of the same on the reflective surfaces 13 on the sides of the light guide 11 can be analyzed into the periodicity of the distribution widths (spatial distances) of color beams and periodicity of the quantities of the color beams. In the present embodiment, although the periodicity of spatial distances is lost, the periodicity of quantities of light is achieved because an end light source provides a quantity of light equivalent to the quantity of light from one LED when combined with the quantity of light emitted by an LED that is a mirror-inverted image of the same in the same color.

As thus described, the present embodiment not only provides the same advantage as that of the first embodiment but also makes it possible to achieve a highly symmetrical light quantity distribution and to space and dispose LEDs 7 in different colors of emission in a preferable manner by actively using a mirror effect generated by reflection at reflective sheets 14 disposed on or in the neighborhood of reflective surfaces 13L and 13R at ends of the light guide 11. Therefore, a surface illuminator having high color uniformity and a liquid crystal display having the same can be provided. The generation of mixed white suffering from an extreme shortage of red components can be suppressed at an arbitrary point in the neighborhood of an end of the light entrance surface 12T, and color irregularities can be made unnoticeable.

Third Embodiment

A description will now be made with reference to FIG. 5 on a surface illuminator employing an array of discrete light sources and a liquid crystal display having the same according to a third embodiment of the invention. A surface illuminator 6 of the present embodiment is similar in configuration to the surface illuminator 6 in the first embodiment, and it has a configuration according to the first embodiment as shown in FIGS. 1 and 2. Therefore, elements identical to those in the first embodiment in operations and effects will be indicated by like reference numerals, and the description thereof will be omitted.

FIG. 5 shows a positional relationship between a light exit surface 16 of a light guide 11 of the backlight unit 6 and LED light sources 15 in the present embodiment in a view of the unit taken in a direction normal to the light exit surface 16. The present embodiment is different from the first embodiment in that a part of light emitted by LEDs 7R serving as end light sources at both ends of light entrance surface 12T and 12B of the light guide 11 is blocked to prevent it from entering the light guide region. More specifically, the LEDs 7 serving as end light sources are disposed such that about one half of their emitting regions is obscured by a reflective surface 13L or 13R to prevent about one half of the quantity of light emitted by the LEDs from entering the light guide region. Hereinafter, light from an LED 7R serving as an end light source will be represented by "(½)R".

Light arriving at an arbitrary point P1 located in the neighborhood of the left end of the light entrance surface 12T includes not only direct light from a "(½)RGBG" set 10 at the left end of the light entrance surface 12T but also light from a "(½)RGBG" set 10" which is a mirror image of the light from the "(½)RGBG" set 10 projected on the reflective surface 13L. The result is equivalent to arranging a "GBG(½)R" set 10" and a "(½)RGBG" set 10 in the order listed from the left side of the figure in the neighborhood of the arbitrary point P1. Among those sets of LEDs, six LEDs 7 and 7' closer to the point constitute a "BG(½)R(½)RGB" set. The set of "(½)R (½)R" is equivalent to one LED 7R in terms of the quantity of light. Thus, intensification of red can be suppressed to obtain white light better in balance that that achievable in the first and the second embodiments, and color irregularities in the neighborhood of the top end of the reflective surface 13L can be significantly reduced. The same configuration also makes it possible to reduce color irregularities in the neighborhood of the bottom end of the reflective surface 13L and top and bottom ends of the reflective surface 13R significantly.

In the present embodiment, the real LED array and the image of the same can be made continuous with each other by aligning the center the end light source at the end of the light entrance surface 12 with the position of the end of the reflective surface 13 of the light guide 11. As a result, both of the periodicity of the distribution widths (spatial distances) of color beams and periodicity of the quantities of the color beams can be achieved by utilizing a mirror effect generated by projection of the LED array on the reflective surface 13 of the light guide 11. In the present embodiment, chromaticity and luminance of surface illumination is more uniform, the higher the mirror quality of reflective surfaces 13 on the sides of the light guide 11 adjacent to the light entrance surfaces 12 of the light guide 11.

As thus described, the present embodiment not only provides the same advantage as that of the first embodiment but also makes it possible to achieve a highly symmetrical light quantity distribution and to space and dispose LEDs 7 in different colors of emission in a preferable manner by making a positive use of a mirror effect generated by reflection at reflective sheets 14 disposed on or in the neighborhood of reflective surfaces 13L and 13R at ends of the light guide 11. Therefore, a surface illuminator having high color uniformity and a liquid crystal display having the same can be provided. The generation of mixed white suffering from an extreme shortage of red components can be suppressed at an arbitrary point in the neighborhood of an end of the light entrance surface 12T, and color irregularities can be made unnoticeable.

Further, the present configuration eliminates a need for adjusting an LED driving circuit as in the second embodiment and also eliminate a need for preparing special LEDs having low emission efficiency to be used as end light sources.

The invention is not limited to the above-described embodiments and may be modified in various ways.

For example, the above embodiments have been described as examples in which end light electrodes at both ends of a light entrance surface 12 are LEDs 7R or 8R emitting in red, the invention is not limited to such embodiments. For example, when a minimum unit array of an array of discrete light sources is "BGRG", the end electrodes on both ends of the light entrance surface 12 are LEDs emitting in blue. The minimum unit array of the array of discrete light sources may be either of "RGBG" and "BGRG" because they may be regarded as identical arrays when the LED arrangement of one of the arrays is shifted in either direction by a half pitch of the light source array. It is therefore possible to use end electrodes in different emission colors at the both ends of the light entrance surfaces 12 with regularity of the pattern of the arrays maintained. For example, the scope of the invention includes an arrangement in which the emission color of the end electrode at the left end of the light entrance surface 12 is red and in which the emission color of the end electrode at the right end of the light entrance surface 12 is blue.

While the LED electrodes 15 are provided on both sides of the light guide 11 in the above-described embodiments, the invention is not limited to such a configuration, and the LED electrodes 15 may be provided on one side only. In the case of a light guide having a wedge-shaped section, the LED electrodes 15 may be obviously provided only on one side of the same.

While the invention is applied to a single light guide in the form of a plane parallel plate in the above-described embodiments, the invention is not limited to the same and may be applied to a backlight unit of any structure such as a double guide surface type that is constructed by stacking two light guide plates one over the other as long as the unit is of the side light type. The invention is applicable not only to backlight units but also to front light units.

While the light guide 11 constituted by a transparent member is used as a light guide region in the above-described embodiments, the invention is not limited to the same. For example, a light guide region may be a hollow air layer as long as reflective members are provided on sides of the light guide region.

While the above embodiments have been described as examples in which a minimum unit array of an array of discrete light sources is constituted by a set of LEDs consisting of four LEDs in "GBGR", the invention is not limited to such embodiments. It is possible to use an array of LEDs whose minimum unit array is "BRBG", an array of LEDs whose minimum unit array is "GBGR", an array of LEDs whose minimum unit array is "RGRB", or an array of LEDs whose minimum unit array is "BRBG".

A minimum unit array of an array of discrete light sources may be a light source set constituted by a set of three "R", "G", and "B" light sources which are provided in series in a predetermined order. In particular, the third embodiment is preferably implemented in such a light source set consisting of three light sources. Further, the invention can be used in a case in which light sources emitting in colors that have a complementary relationship with "R", "G, and "B".

The invention is also advantageous in a case in which LEDs having the same color of emission are arranged side by side. For example, when white LEDs are consecutively arranged, the minimum unit of the array is one LED, and variation in the quantity of light can occur between the LEDs. However, when the LED provided at an end of the LED array 15 arranged opposite to the side surface 12T of the light guide is disposed such that a central part thereof faces the side surface 13L of the light guide, periodicity can be completely achieved between the LED array 15 and a mirror image 10" of the LED array 15 projected on the side surface 13L of the guide plate.

While LEDs are used as light sources in the above-described embodiments, the invention is not limited to them, and any type of light-emitting bodies may be used as long as an array of discrete light sources can be formed.

What is claimed is:

1. A surface illuminator comprising:
a light exit region which spreads in the form of a plane and from which light exits;
a light guide region for guiding light to the light exit region;
a light entrance surface through which light enters the light guide region;
a reflective surface extending from an end of the light entrance surface and reflecting light in the light guide region;
an array of discrete light sources which are plural types of light sources emitting beams of light having different emission wavelength spectra and which are alternately and discretely provided along the light entrance surface; and
an end light source for emitting light having a quantity of light smaller than that of the other light sources of the same type in the array of discrete light sources toward the light guide region.

2. A surface illuminator according to claim 1, wherein a part of light emitted by the end light source is blocked and prevented from entering the light guide region.

3. A surface illuminator according to claim 2, wherein the end light source is provided such that a part of light emitted by the same is blocked by the reflective surface and prevented from entering the light guide region.

4. A surface illuminator according to claim 2, wherein substantially one half of the quantity of light emitted by the end light source enters the light guide region.

5. A surface illuminator according to claim 1, wherein the end light source emits a quantity of light which is substantially one half of light from the other light sources of the same type.

6. A surface illuminator according to claim 1, wherein:
the array of discrete light sources includes a light source set comprising three light sources, a light source in a color X, a light source in a color Y, and a light source in a color Z, provided in series at a side end of the reflective surface; and
the end light source is the light source among the light source set which is closest to the side end of the reflective surface.

7. A surface illuminator according to claim 1, wherein:
the array of discrete light sources includes a light source set comprising a light source in a color X, a light source in a color Y, a light source in a color Z, and another light source in the color Y, provided in series in the order listed starting at a side end of the reflective surfaces and
the end light source is the light source in the color X among the light source set.

8. A surface illuminator comprising:
a light exit region which spreads in the form of a plane and from which light exits;
a light guide region for guiding light to the light exit region;
a light entrance surface through which light enters the light guide region;
reflective surfaces extending from both ends of the light entrance surface and reflecting light in the light guide region;
an array of discrete light sources including a light source set comprising a light source in a color X, a light source in a color Y, a light source in a color Z, and another light source in the color Y provided in series in the order listed starting at one of the ends of the light entrance surface; and
another light source in the color X provided at the other of the ends of the light entrance surface.

9. A surface illuminator according to claim 6, wherein: the color X is blue or red; the color Y is green; and the color Z is red or blue.

10. A surface illuminator according to claim 1, wherein the light source is an LED.

11. A surface illuminator according to claim 1, wherein the light guide region is a light guide constituted by a transparent member.

12. A surface illuminator according to claim 1, wherein the light guide region is a layer of air.

13. A surface illuminator according to claim 1, wherein a couple of the light entrance surfaces are provided opposite to each other.

14. A surface illuminator according to claim 1, wherein the reflective surface is substantially a mirror surface.

15. A surface illuminator according to claim 1, wherein a reflective sheet is provided on a backside of the reflective surface.

16. A surface illuminator according to claim 1, wherein the reflective surface is provided at both ends of the light entrance surface.

17. A liquid crystal display comprising a liquid crystal display panel provided by sealing a liquid crystal between a pair of substrates and a surface illuminator for illuminating the liquid crystal display panel, wherein the surface illuminator is the surface illuminator according to claim 1.

18. A liquid crystal display according to claim 17, wherein the surface illuminator serves as a backlight unit.

19. A liquid crystal display comprising a liquid crystal display panel provided by sealing a liquid crystal between a pair of substrates and a surface illuminator for illuminating the liquid crystal display panel, wherein the surface illuminator is the surface illuminator according to claim 8.

* * * * *